US012637946B2

(12) United States Patent
Knapp et al.

(10) Patent No.: US 12,637,946 B2
(45) Date of Patent: May 26, 2026

(54) METHOD FOR PRODUCING A HOUSING, AND SHELL HOUSING AND HOUSING FOR A ROTARY PISTON ENGINE

(71) Applicant: Knapp e-mobility GmbH, Stuttgart (DE)

(72) Inventors: Ulrich Knapp, Remseck (DE); James Hartman, Oberriexingen (DE); Peter Riegraf, Fellbach (DE)

(73) Assignee: Knapp e-mobility GmbH, Stuttgart (DE)

( * ) Notice: Subject to any disclaimer, the term of this patent is extended or adjusted under 35 U.S.C. 154(b) by 0 days.

(21) Appl. No.: 18/374,027

(22) Filed: Sep. 28, 2023

(65) Prior Publication Data

US 2024/0110480 A1 Apr. 4, 2024

(30) Foreign Application Priority Data

Sep. 29, 2022 (DE) ..................... 10 2022 210 341.6

(51) Int. Cl.
F01C 1/22 (2006.01)
B23P 19/02 (2006.01)
F01C 21/10 (2006.01)

(52) U.S. Cl.
CPC .............. F01C 1/22 (2013.01); B23P 19/02 (2013.01); F01C 21/106 (2013.01); *F05C 2201/021* (2013.01); *F05C 2201/903* (2013.01)

(58) Field of Classification Search
None
See application file for complete search history.

(56) References Cited

U.S. PATENT DOCUMENTS

| | | | | |
|---|---|---|---|---|
| 3,173,406 A | * | 3/1965 | Campos ................. | F02B 53/00 |
| | | | | 418/57 |
| 3,239,135 A | * | 3/1966 | Fritz ....................... | F02B 55/08 |
| | | | | 418/179 |
| 3,289,649 A | * | 12/1966 | Lamm ..................... | F02B 55/08 |
| | | | | 123/193.2 |
| 3,487,815 A | * | 1/1970 | Marks ..................... | F02B 53/00 |
| | | | | 123/216 |
| 3,680,990 A | * | 8/1972 | Pettibone ................ | F04C 2/086 |
| | | | | 29/888.023 |
| 4,028,021 A | * | 6/1977 | Berkowitz ............ | F01C 21/106 |
| | | | | 418/56 |

(Continued)

FOREIGN PATENT DOCUMENTS

| | | | | |
|---|---|---|---|---|
| DE | 24 21 240 B2 | 11/1975 | | |
| DE | 2421240 A1 | * 11/1975 | .............. | F02B 55/08 |

(Continued)

OTHER PUBLICATIONS

DE 2421240, English Language Machine Translation (Year: 1975).*

(Continued)

*Primary Examiner* — Wesley G Harris
(74) *Attorney, Agent, or Firm* — Crowell & Moring LLP

(57) ABSTRACT

A method for producing a housing for a rotary piston engine, a shell housing, and a housing for a rotary piston engine, are disclosed. A bushing of hard metal is pressed into a shell housing main body with a trochoidal raceway in such a manner that an external circumferential contour of the bushing bears in a sealing manner on the trochoidal raceway and the trochoidal raceway is cladded via the bushing.

7 Claims, 2 Drawing Sheets

(56) References Cited

U.S. PATENT DOCUMENTS

| | | | | |
|---|---|---|---|---|
| 4,044,589 A | * | 8/1977 | Waimsley | B23P 15/00 |
| | | | | 29/888.012 |
| RE29,806 E | * | 10/1978 | Iida | F02B 55/08 |
| | | | | 164/112 |
| 4,464,101 A | * | 8/1984 | Shibuya | F01C 21/0809 |
| | | | | 418/125 |
| 6,481,989 B2 | | 11/2002 | Eiermann | |
| 2018/0347563 A1 | * | 12/2018 | Wollmann | F04C 14/28 |
| 2021/0222692 A1 | | 7/2021 | Hinrichs et al. | |

FOREIGN PATENT DOCUMENTS

| | | | | | |
|---|---|---|---|---|---|
| DE | 25 45 922 A1 | | 4/1977 | | |
| DE | 101 24 561 A1 | | 11/2001 | | |
| DE | 10 2017 223 715 A1 | | 6/2019 | | |
| FR | 3081184 A1 | * | 11/2019 | | |
| GB | 1 443 928 A | | 7/1976 | | |
| GB | 1 454 888 | | 11/1976 | | |
| JP | 62103424 A | * | 5/1987 | | F02B 55/08 |
| WO | WO-2007026109 A1 | * | 3/2007 | | F04C 15/0011 |
| WO | WO-2013079058 A2 | * | 6/2013 | | F01C 21/106 |
| WO | WO-2014072152 A2 | * | 5/2014 | | C25D 11/04 |

OTHER PUBLICATIONS

German-language Office Action issued in German Application No. 10 2022 210 341.6 dated Jun. 9, 2023 (6 pages).
German-language Extended European Search Report issued in European Application No. 23198982.3 dated Feb. 27, 2024 with partial English translation (8 pages).

* cited by examiner

METHOD FOR PRODUCING A HOUSING, AND SHELL HOUSING AND HOUSING FOR A ROTARY PISTON ENGINE

CROSS REFERENCE TO RELATED APPLICATION

This application claims priority under 35 U.S.C. § 119 from German Patent Application No. 102022210341.6, filed Sep. 29, 2022, the entire disclosure of which is herein expressly incorporated by reference.

BACKGROUND AND SUMMARY

The invention relates to a method for producing a housing for a rotary piston engine, and to a shell housing and a housing for a rotary piston engine.

Referred to as rotary piston engine (German Kreiskolbenmotor, KKM for short) in the context of the application is a rotary piston engine of the Wankel design, comprising a curved-triangular rotor, also referred to as rotor or rotary piston or piston for short, which revolves in a figure-eight-like shell housing. A contour of the shell housing has at least substantially an epitrochoidal shape. The shell housing is also referred to as a trochoid-shaped housing.

A housing for the rotary piston engine usually also comprises two lateral parts which are disposed on both sides of the shell housing. During rotation, the rotor drives an eccentric shaft on which said rotor is also mounted. The central axis of the eccentric shaft is situated on the central axis of the shell housing. Sealing strips which ideally permanently contact a wall of the shell housing are disposed at the tips or piston corners of the rotor, so that three independent operating chambers of alternating size are formed in which a four-stroke process takes place during the rotation of the rotor.

In rotary piston engines of this type, it is known for the shell housing to be made of aluminum for weight reasons. In order to reduce wear on a raceway of the trochoid-shaped housing made of aluminum, it is known to provide the raceway with a wear-resistant surface coating. In particular, it is known for a nickel-dispersion coating (e.g. Nikasil®) to be applied.

It is an object of the invention to achieve a cost-effective method for producing a housing for a rotary piston engine, which meets the high requirements set for tightness between the shell housing and the rotor and has sufficient wear resistance. Further objects lie in achieving a cost-effective shell housing which can be produced in series, and an associated housing for a rotary piston engine.

According to a first aspect, a method for producing a housing for a rotary piston engine, comprising a shell housing main body with a trochoidal raceway, wherein a bushing of hard metal is pressed into the shell housing main body in such a manner that an external circumferential contour bears in a sealing manner on the trochoidal raceway and the trochoidal raceway is cladded by means of the bushing.

A wall of the shell housing main body that faces the rotor is referred to as the trochoidal raceway herein. The actual raceway, which during use is contacted by sealing strips fixed to the rotor, is formed by a surface of the bushing.

In embodiments, the shell housing main body is manufactured by a casting method. The press-fitted bushing of hard metal is also referred to as a press-fit bushing. In an embodiment, the press-fit bushing is manufactured from stainless steel or tool steel. For example, the press-fit bushing is manufactured from H13 tool steel or 1.2709 tool steel. These tool steels are characterized by high wear resistance even at high temperatures. However, the invention is not limited to the use of these tool steels. Depending on the specific application, a material of the bushing is selectable in a suitable manner by the person skilled in the art, in particular also as a function of the fuel with which an associated rotary piston engine is to be operated.

A surface coating can be dispensed with thanks to the bushing.

In an embodiment, the bushing has an initial shape with an oval circumferential contour, wherein a force is applied to the bushing when press-fitting so that the bushing is elastically deformed and the circumferential contour bears in a sealing manner on the trochoidal raceway. This permits the bushing to be cost-effectively manufactured in serial production and/or a use of cost-effective standard components. The invention exploits the surprising finding that an elastic deformation of the bushing in order for the bushing to bear on the trochoidal raceway has no noticeable effect on the properties of said bushing as the raceway for the rotor. In an embodiment, the bushing is manufactured from a stamped sheet-metal or strip-metal part which is formed to an oval and welded. In other embodiments, the bushing is produced by deep-drawing or impact extrusion. The bushing is elastically deformed when press-fitting so that said bushing bears on the trochoidal raceway. In the context of the application, a shape of the bushing prior to press-fitting is referred to as the initial shape of the bushing. In embodiments, the initial shape is an intermediate product produced by forming and welding, as described.

The bushing is not connected to the shell housing main body in a materially integral manner. In the event of a worn bushing, the latter can therefore be dismantled from the shell housing main body and refurbished or replaced without the shell housing main body also having to be replaced. In an embodiment, a method for producing a refurbished housing is in particular also provided, wherein the press-fitted bushing is removed and replaced by another bushing. Furthermore, in an embodiment, an associated rotary piston engine can be adapted to different fuels by removing and replacing the bushing.

In an embodiment, the shell housing main body is of aluminum or an aluminum alloy and manufactured by an aluminum die-casting method. Modern aluminum die-casting methods permit the shell housing main body to be precision-manufactured so that a reliable connection between the shell housing main body and the bushing after press-fitting of the bushing is guaranteed. Depending on the embodiment, the shell housing main body has connections for an intake and/or an exhaust and/or duct structures for cooling. In an embodiment, the shell housing main body is manufactured in multiple parts, while an integral shell housing main body is provided in other embodiments.

In an embodiment, the produced housing furthermore has two lateral parts which are disposed on both sides of the shell housing, wherein a slide plate of hard metal is in each case provided between the lateral parts and the shell housing. In embodiments, the slide plates and the bushing are manufactured from a uniform material. In other embodiments, the slide plates and the bushings are manufactured from same materials. In an embodiment, both lateral parts are designed as end plates. In other embodiments, the housing comprises a plurality of shell housings for a plurality of rotors, wherein at least one lateral part is designed as an intermediate plate between two shell housings. In an embodiment, the slide plates bear on the ends of the bushing so that the bushing and the slide plates form a sealed joint for the operating chambers of the rotary piston engine during use.

According to a second aspect, a shell housing for a rotary piston engine is provided, comprising a shell housing main body with a trochoidal raceway, wherein a bushing of hard metal is pressed into the shell housing main body in such a way that an external circumferential contour bears in a sealing manner on the trochoidal raceway and the trochoidal raceway is cladded by means of the bushing.

A shell housing for which a surface coating can be dispensed with is achieved as a result.

In an embodiment it is provided that the bushing has an initial shape with an oval circumferential contour, and the bushing is elastically deformed for bearing in a sealing manner on the trochoidal raceway.

In an embodiment it is provided that the bushing is received in the shell housing main body so as to be replaceable without destroying the shell housing main body. In the event of a worn bushing, the bushing can be disassembled from the shell housing main body and be replaced by another bushing, or be re-assembled after refurbishing.

In embodiments, the shell housing main body is manufactured from a light metal, in particular from aluminum or an aluminum alloy.

According to a third aspect, a housing for a rotary piston engine is provided, comprising a shell housing, a lateral part, and a slide plate of hard metal, wherein the slide plate is disposed between the lateral part and the shell housing.

In the context of the application, the terms "a", "of a", etc. are used as indefinite articles and not as numerals. In embodiments it is provided in particular that two lateral parts which are disposed on both sides of the shell housing are provided.

In embodiments, the lateral part and the shell housing have mutually facing planar surfaces on which the slide plate bears. During use, the slide plates here permit reliable sealing of the operating chambers of the rotary piston engine and of an oil circuit, thus prolonging the durability of the rotary piston engine.

An associated rotary piston engine can be adapted to different fuels by removing and replacing the bushing and the two slide plates. This results in a housing for a multifuel engine which—depending on the requirement—is able to be operated with petrol, diesel, hydrogen or other fuels.

Depending on the specific application, a material and a material thickness of the slide plates are selectable in a suitable manner by the person skilled in the art. In an embodiment, the slide plate has a material thickness of approx. 0.8 mm to approx. 2.4 mm.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
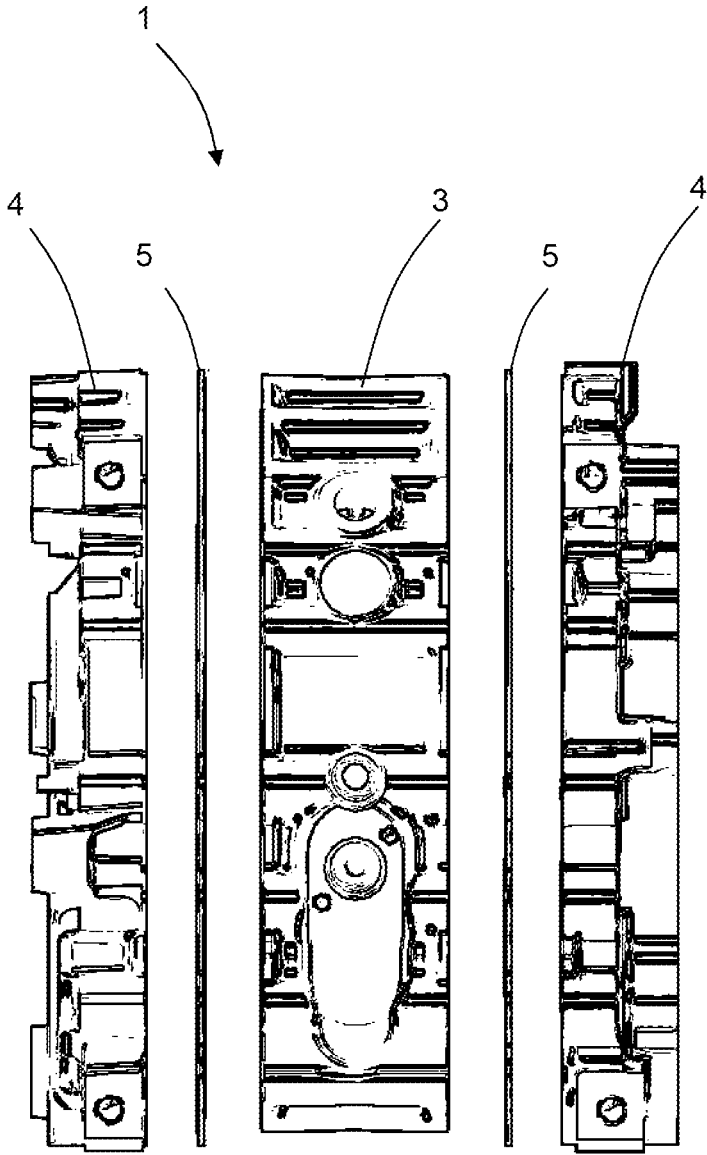
FIG. 1 shows a housing of a rotary piston engine, comprising a shell housing, two lateral parts, and two slide plates, in a lateral view.

FIG. 1 shows a housing of a rotary piston engine, comprising a shell housing 3, two lateral parts 4, and two slide plates 5 which are disposed between the shell housing 3 and the lateral parts 4, in a lateral view. The lateral parts 4 and the shell housing 3 in the exemplary embodiment illustrated have mutually facing planar surfaces, the slide plates 5 bearing in each case on the planar surfaces of the lateral parts 4 and the shell housing 3.

Figure 2:
FIG. 2 shows the shell housing according to FIG. 1 and a rotor arranged therein, in a perspective frontal view.

FIG. 2 schematically shows the shell housing 3 and a rotor 2 received therein. The rotor 2 visible in FIG. 2 drives an eccentric shaft, not illustrated, so as to rotate about a schematically indicated central axis A.

As can be seen in FIG. 2, the shell housing 3 comprises a shell housing main body 30 with a trochoidal raceway, and a bushing 31 of hard metal. The bushing 31 is pressed into the shell housing main body 30 in such a way that an external circumferential contour of the bushing 31 bears in a sealing manner on the trochoidal raceway and the trochoidal raceway is cladded by means of the bushing.

In an embodiment, the bushing 31 conjointly with the slide plates 5 according to FIG. 1 forms a sealed joint.

Sealing strips 21, which bear in a sealing manner on the surface of the bushing 31 and are moved along the surface of the bushing 31 while the rotor 2 is in motion, are provided at each piston corner 20 of the rotor 2. Furthermore, curved strips 22 are provided on the surfaces of the rotor 2. The slide plates 5 illustrated in FIG. 1 serve as raceways for the curved strips 22, wherein the curved strips 22 bear in a sealing manner on the slide plates 5.

In this way, three sealed operating chambers of alternating size are formed by means of the bushing 31, the slide plates 5, the sealing strips 21, and the curved strips 22, wherein a four-stroke process is taking place in said operating chambers during a rotation of the rotor.

In the exemplary embodiment illustrated, an intake and an exhaust are in each case provided on the trochoidal raceway of the shell housing 3, wherein the bushing 31 has corresponding clearances 32. In other embodiments, a lateral intake and/or a lateral exhaust is/are provided in a lateral part, whereby one of the slide plates 5 is provided with corresponding clearances.

The shell housing 3 with the press-fitted bushing 31 is characterized by a high wear-resistance and permits a smooth surface for reliable sealing of the operating chambers. Particularly cost-effective manufacturing in serial production is possible by using a bushing which in an initial shape has an oval circumferential contour, and which is elastically deformed when press-fitting into the shell housing main body 30.

The use of the bushing 31 is also advantageous in embodiments of a housing 1 which has no slide plates 5, and/or in which slide plates are provided that are received in clearances on the lateral parts and/or on the shell housing main body.

In the event of a worn bushing 31, the bushing 31 can be disassembled and replaced without destroying the shell housing main body 30.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a housing for a rotary piston engine, comprising:

providing a shell housing main body with a trochoidal raceway;

press-fitting a bushing of hard metal into the shell housing main body such that an external circumferential contour of the bushing bears in a sealing manner on the trochoidal raceway and the trochoidal raceway is cladded via the bushing, wherein the bushing has a first shape that is oval, and upon an application of a force to the bushing when press-fitting, the bushing is elastically deformed into a second, epitrochoidal, shape that is different from the first, oval, shape, such that an external circumferential contour of the bushing bears in a sealing manner on the trochoidal raceway of the rotary piston engine, and the trochoidal raceway is cladded via the bushing.

2. The method according to claim 1, further comprising:

replacing the bushing when the bushing is damaged or worn.

3. The method according to claim 1, wherein the shell housing main body is of aluminum or an aluminum alloy and manufactured by an aluminum die-casting method.

4. The method according to claim 1, wherein the housing has two lateral parts which are disposed on both sides of the shell housing main body, and a slide plate of hard metal is provided in each case between the two lateral parts and the shell housing main body.

5. The method according to claim 4, wherein the two lateral parts and the shell housing main body have mutually facing planar surfaces on which the slide plate bears.

6. The method according to claim 5, wherein the slide plate has a material thickness of approx. 0.8 mm to approx. 2.4 mm.

7. The method according to claim 1, wherein the bushing is received in the shell housing main body so as to be replaceable without destroying the shell housing main body.

* * * * *